United States Patent
Broyles et al.

(10) Patent No.: US 6,630,411 B1
(45) Date of Patent: Oct. 7, 2003

(54) METHOD AND APPARATUS FOR REMOVING WATER VAPOR AS A BYPRODUCT OF CHEMICAL REACTION IN A WAFER PROCESSING CHAMBER

(75) Inventors: Robert D. Broyles, Battle Ground, WA (US); Michael J. Berman, Portland, OR (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 10/140,536

(22) Filed: May 7, 2002

(51) Int. Cl.[7] .................... H01L 21/31; B01D 8/00
(52) U.S. Cl. .................. 438/778; 438/773; 62/55.5
(58) Field of Search .................. 62/600, 601, 51.2, 62/614, 268, 55.5; 257/712, 716, 721; 438/778, 773, 905, 909

(56) References Cited

U.S. PATENT DOCUMENTS

| | | | |
|---|---|---|---|
| 4,724,677 A | * 2/1988 | Foster | .......... 62/55.5 |
| 5,009,073 A | * 4/1991 | Missimer et al. | .......... 62/51.1 |
| 6,461,675 B2 | * 10/2002 | Paranjpe et al. | .......... 427/250 |

* cited by examiner

*Primary Examiner*—Carl Whitehead, Jr.
*Assistant Examiner*—David L. Hogans
(74) *Attorney, Agent, or Firm*—Maginot, Moore & Bowman, LLP

(57) ABSTRACT

A system, apparatus and/or method is provided for removing water vapor from a wafer processing chamber generated as a byproduct of wafer processing. A water vapor trap is used to collect the water vapor byproduct from the processing chamber interior. The water vapor trap has at least a portion thereof in communication with an interior of the processing chamber for collection of the water vapor and another portion thereof in communication with an exterior of the processing chamber. The portions are movable with respect to the interior and exterior of the processing chamber such that the portions may switch places. This allows the processing chamber to be in at least a substantially continuous mode of operation while still providing for the removal of water vapor byproduct via the water vapor trap. The "used" portion of the water vapor trap is regenerated while the "clean" portion is collecting water vapor.

6 Claims, 7 Drawing Sheets

METHOD AND APPARATUS FOR REMOVING WATER VAPOR AS A BYPRODUCT OF CHEMICAL REACTION IN A WAFER PROCESSING CHAMBER

BACKGROUND OF THE INVENTION

1. Field of the Invention

The subject invention relates to the manufacture of semiconductor devices and, more particularly, to wafer fabrication and/or processing.

2. Description of the Art

The manufacture of semiconductor wafers to create semiconductor integrated circuit devices typically involves a sequence of processing steps that fabricate the multi-layer structure generally associated with the integrated circuit devices. Such processing steps may include (1) the deposition of metals, dielectrics, and semiconductor films, (2) the creation of masks by lithography techniques, (3) the doping of semiconductor layers by diffusion or implantation, (4) the polishing of outer layers (e.g. chemical-mechanical polishing), and (5) the etching of layers for selective or blanket material removal.

Semiconductor integrated circuits are typically fabricated by a layering process in which several layers of material are applied on or in a surface of a wafer, or on a surface of a previous layer. These layers can constitute a metal pattern forming various elements of an electrical circuit. Insulating material and dielectric material are added at various stages of the fabrication process. The layers are typically treated to create a smooth, planar surface. In addition to the surface characteristics, the thickness of the thin film layers can be critical to the performance of a semiconductor and/or its circuit components. For example, the performance characteristics of a particular circuit element may be affected, usually detrimentally, by a dielectric film thickness.

In forming a semiconductor device, one common practice has been to use deposition techniques to apply a particular layer to an existing substrate or layer. In one type of process, a vapor deposition tube sprays a vapor including the layer material onto the workpiece (i.e. semiconductor wafer). In a typical vapor deposition process, the thickness of the thin film layer is measured following completion of the deposition. Under these circumstances, the film thickness is generally controlled by the amount of time that the device is exposed to the vapor deposition process. The subsequent measurement of the film thickness is often accomplished in a "go/no-go" manner in which devices having a film thickness falling outside a predetermined thickness range are rejected and scrapped. In other cases, the semiconductor device is returned for further processing, either for additional material deposition, or for material removal such as in a polishing process. Ordinarily, the economics of mass production mitigate in favor of simply scrapping the component.

Wafer processing such as that described above is typically accomplished in a wafer processing chamber. An exemplary wafer processing chamber has a processing head that introduces a gas or gasses into the processing chamber. A bias voltage may or may not be applied to the processing head. The wafer processing chamber also includes other components for processing the wafer. It is generally necessary to maintain relatively precise control of various parameters such as the temperature of a semiconductor wafer during performance of certain of the processing steps associated with manufacture of the wafer. For example, a number of processing steps associated with wafer fabrication involve complex chemical reactions that require the temperature of the semiconductor wafer to be controlled within predetermined specifications.

In some types of wafer fabrication water is a byproduct of the reaction. Particularly, in wafer fabrication with respect to low k films, water is a major byproduct of the reaction. Additionally, it is desirable to remove as much of the water vapor as the system will allow. The main method for accomplishing water vapor removal is to increase the pumping speeds of the systems vacuum pumps. A problem with this method is that by increasing the pumping speeds to remove unwanted water vapor, other gases needed for processing are removed.

One way to improve the pumping speed is to use a form of Meissner trap. A Meissner trap will freeze the water in the chamber, improving the quality of the film. A Meissner trap will greatly reduce the particle pressure of water vapor in a processing chamber without changing the other gasses being used in the particular process.

The above systems utilize a Meissner or cold trap to improve the ability to pump down (evacuate or reduce the pressure of) the processing chamber. Particularly, the cold trap is used to improve the ability of the processing chamber to pump down quickly to a base pressure needed for wafer processing. A problem with these systems is that they utilize full cryo-pumps that operate at very low temperatures. Another method to remove water vapor is to increase the pump speed and/or pump volume. While increasing the pump speed and/or volume may work to remove more water vapor, such will also remove the beneficial gas or gasses from within the processing chamber. This would then make the system provide more processing gas than necessary.

What is needed in view of the above, is a method of and/or apparatus for removing water vapor from a wafer processing chamber during wafer fabrication.

What is further needed in view of the above is a method of and/or apparatus for removing water vapor from a wafer processing chamber, the water vapor being a byproduct of wafer processing.

What is even further needed in view of the above, is a method of and/or apparatus for substantially continuously removing water vapor from a substantially continuously operating wafer processing chamber, the water vapor being a byproduct of wafer processing.

SUMMARY OF THE INVENTION

The subject invention is a process and apparatus for removing water vapor from within a wafer processing chamber, the water vapor generated as a byproduct of wafer processing and/or as a constituent of background gases. Preferably, water vapor removal is accomplished essentially continuously during wafer processing.

In one form, there is provided a method of operating a wafer processing chamber, the wafer processing chamber defining an interior and having a processing head in the interior and in communication with a processing gas, a wafer holder in the interior and adapted to receive a wafer for processing, and a pumping port in communication with the interior and a pump. The method of operating the wafer processing chamber includes the steps of: (a) providing a water vapor accumulator having at least a portion thereof in communication with the interior of the processing chamber; (b) cooling the portion of the water vapor accumulator in communication with the interior of the processing chamber to a water vapor condensation temperature; (c) processing a wafer supported on the wafer holder utilizing the process gas, the wafer processing generating water vapor as a byproduct; and (d) accumulating the generated water vapor on the portion of the water vapor accumulator in communication with the interior of the processing chamber.

In another form, there is provided a method of wafer processing. The method includes the steps of: (a) placing a first surface of a water vapor trap in communication with an interior of the wafer processing chamber; (b) cooling the first surface to a water vapor condensation temperature; (c) processing a wafer in a wafer processing chamber using a processing gas, the wafer processing producing water vapor as a byproduct; (d) accumulating the byproduct water vapor on the first cooled surface; (e) moving the first cooled surface from communication with the interior of the wafer processing chamber to a position exterior to the interior of the wafer processing chamber; (f) moving a second surface of the water vapor trap in communication with the interior of the wafer processing chamber; and (g) cooling the second surface to the water vapor condensation temperature.

In yet another form, there is provided a system for processing a wafer. The system includes a processing chamber, a processing head disposed in the processing chamber and in communication with a source of processing gas, a vacuum port in the processing chamber and in communication with a vacuum source, a wafer holder in the processing chamber and configured to releasably receive a wafer for processing; and a water vapor trap at least partially disposed in the processing chamber. The water vapor trap is operative to cool a first surface of the water vapor trap to a water vapor condensation temperature during wafer processing, to accumulate water vapor generated as a byproduct result of wafer processing utilizing the processing gas and condensed thereon, move the first surface out from the interior, and position a second surface of the water vapor trap into communication with the interior, the water vapor trap further operative to cool the second surface to the water vapor condensation temperature during wafer processing and to accumulate the generated byproduct result of wafer processing.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views.

DETAILED DESCRIPTION OF THE INVENTION

Figure 1:
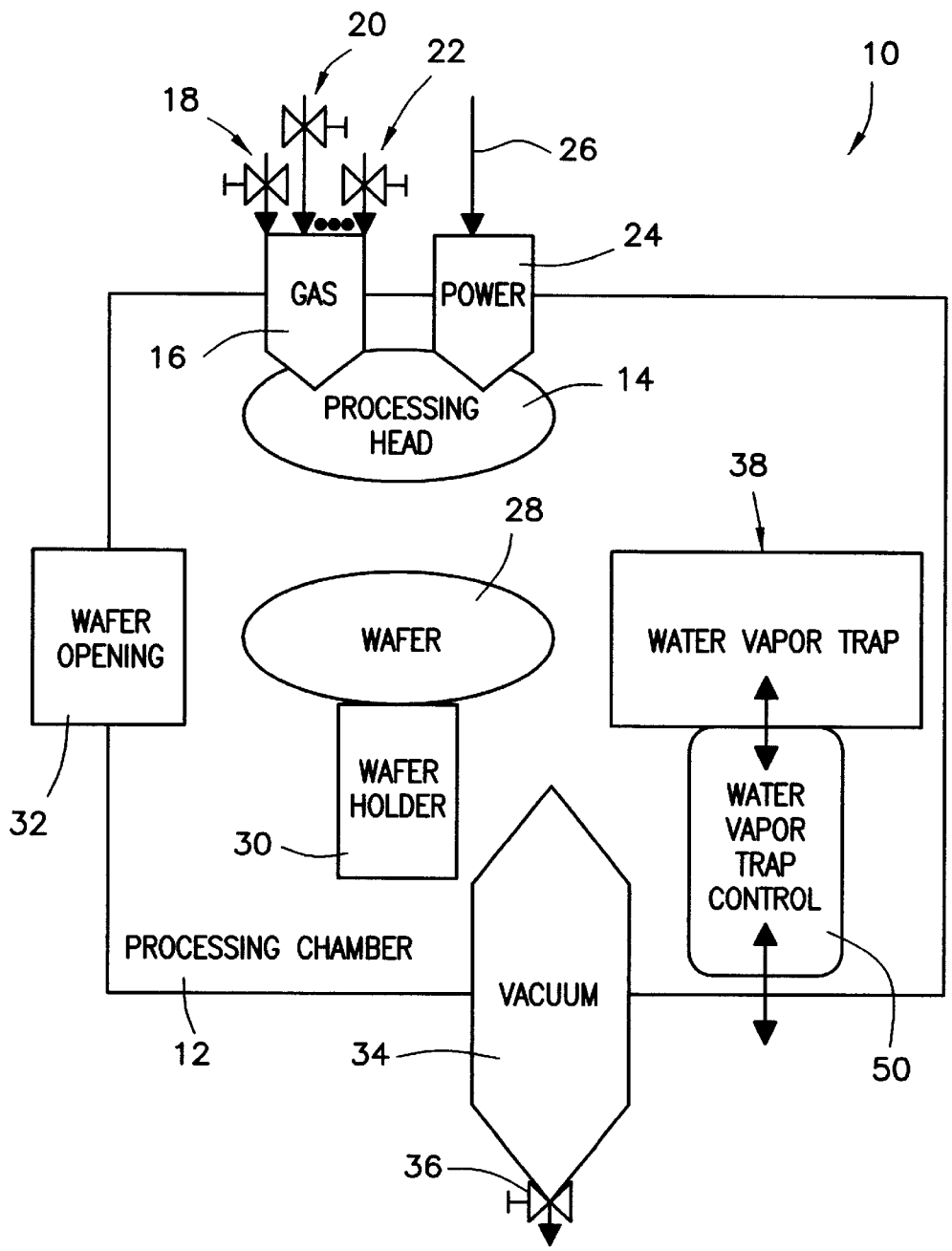
FIG. 1 is a block diagram of an exemplary apparatus for processing wafer in accordance with the principles of the subject invention.

With reference now to FIG. 1, there is shown a block diagram of an exemplary environment, generally designated 10, for processing a wafer in accordance with the subject principles. The exemplary environment 10 may be embodied as a wafer processing system and/or apparatus. The wafer processing system 10 includes a processing chamber, enclosure, or the like (collectively, chamber) 12 fabricated from a material such as a metal that is suitable for various types of wafer fabrication. Wafer fabrication may include, without being limiting, etching, CVD, ASH, or any other type of wafer processing as is known in the art. The processing chamber 12 encloses a processing head 14 and a wafer holder or chuck 30. The processing head 14 is in communication with a gas or various gases, represented by gas inlet 16, each one of which or a combination thereof being suitable for the type of wafer processing being performed. The gas inlet 16 is shown coupled to pipes/inlets/valves 18, 20, and 22 representing one or a plurality of regulated and/or controlled gas source(s)/inlet(s). The processing head 14 is configured, adapted, and/or operative to introduce a gas and/or gases as appropriate for the particular process being used on the wafer 28.

The processing head 14 may also be in communication with a source of electricity represented by power port 24. The power port 24 is shown coupled to an incoming line 26, which in turn, is in communication with a source of electricity (not shown). The source of electricity provides suitable electrical power. Particularly, the source of electricity provides a bias voltage for the processing head 14 should the processing head 14 require a biasing voltage for the particular process being performed on the wafer 28 and/or in the processing chamber 12.

The processing chamber 12 has an opening, valve, door, or the like 32 (labeled "wafer opening" in FIG. 1) that provides controlled and/or regulated ingress and egress of a wafer 28 into the processing chamber 12. Particularly, the wafer opening 32 allows a wafer to placed into the processing chamber 12 and be received by the wafer holder 30. The wafer opening 32 also allows the processed wafer 28 to be removed from the wafer holder 30/processing chamber 12. The wafer holder 30 preferably moves in an appropriate and controlled and/or regulated manner to and from the wafer opening 32 to receive an unprocessed wafer and dispatch a processed wafer once processing is complete, rather than the wafer being moved onto the wafer holder 30. However, various other manners are contemplated.

The processing chamber 12 also includes a pumping/vacuum port 34. The pumping port 34 is in communication with a vacuum pump or source (not shown) that is represented by the valve/inlet 36. The processing chamber 12 may be pumped out to achieve vacuum pressure(s) therein and/or pressures that are below normal atmospheric pressure. The pressure at which the processing chamber 12 is maintained by the vacuum pump via the vacuum port 36 depends on the particular process being performed on the wafer 28. Additionally, the speed at which a particular pressure is reached is dependent upon the vacuum pump.

In accordance with an aspect of the subject invention, a water vapor trap 38 is associated with the processing chamber 12. The water vapor trap 38 is configured, adapted and/or operative to trap and/or accumulate water vapor that is within the processing chamber 12. Particularly, the water vapor trap 38 is configured, adapted and/or operative to trap and/or accumulate water vapor that is generated and/or produced as a byproduct of wafer processing. More particularly, the water vapor trap 38 is configured, adapted and/or operative to trap and/or accumulate water vapor generated and/or produced as a byproduct of wafer processing and allow removal of the trapped and/or accumulated water vapor. The water vapor trap 38 is further configured, adapted and/or operative to remove the trapped and/or accumulated water vapor and/or have the trapped and/or accumulated water vapor removed therefrom in a manner to allow the processing chamber to operate in a relatively continuous manner. The water vapor removal process may be termed "regening" wherein after the water vapor removal process, the water vapor trap and/or a portion of the water vapor trap may be termed "regened."

The water vapor trap 38 operates and/or functions during wafer processing to collect water/water vapor liberated, generated, and/or produced as a result of and/or as a byproduct of wafer processing, particularly of the interaction of the gas or gasses with the wafer 28 and/or substrate, coating or the like thereof. In one form, the water vapor trap 38 collects water/water vapor produced during wafer processing up to a capacity of water vapor for the water vapor trap 38 or a portion thereof and allows removal of the collected water/water vapor while the water vapor trap or another portion thereof permits further collection of water/water vapor during further wafer processing (the same or different wafers). Water/water vapor removal in accordance with the principles of the subject invention may be considered continuous and/or cyclic.

In accordance with the operation and/or function thereof, the water vapor trap 38 is in communication with a water vapor trap control 50 represented by the double-headed arrow therebetween. The water vapor trap control 50 is representative of control and/or regulation of operation and/or functionality of the water vapor trap 38. In one form as explained further below, this includes providing and/or controlling movement of the water vapor trap 38 or a portion thereof. In another form as explained below, this includes supplying and/or regulating coolant to and for the water vapor trap 38. In a yet further form, the water vapor trap control 50 may include control and/or regulation of heat to and for the water vapor trap 38. The water vapor trap control 50 may also be in communication with an external controller, processor, processing circuitry/logic and/or the like, as represented by the double-headed arrow emanating from the water vapor trap control 50 and the processing chamber 12.

Figure 2:
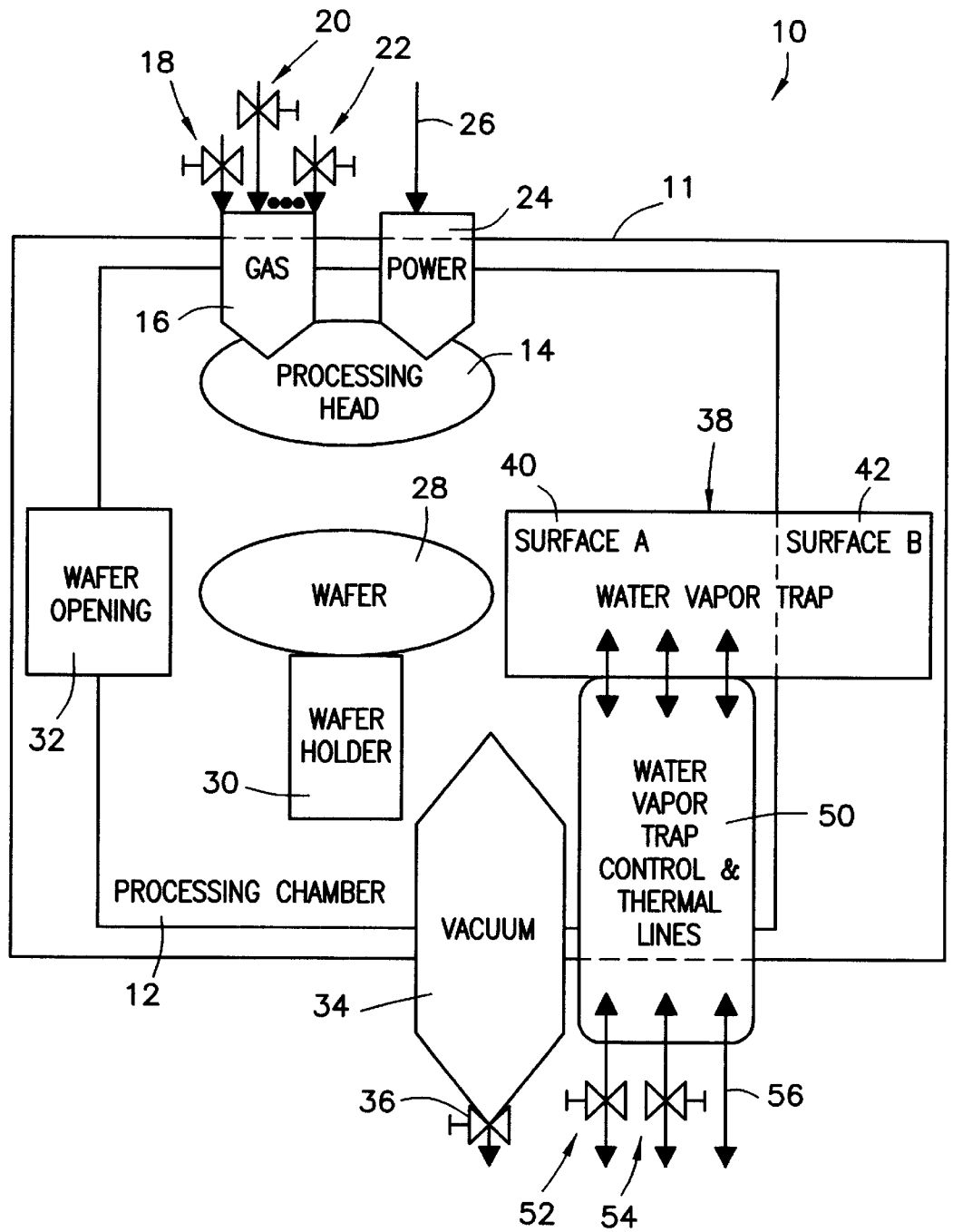
FIG. 2 is a block diagram of an exemplary apparatus for processing a wafer in accordance with the principles of the subject invention.

Referring now to FIG. 2, another exemplary embodiment of a wafer processing system 10 is shown. In the wafer processing system 10 of FIG. 2, the water vapor trap 38 includes a first surface 40 (Surface A) and a second surface 42 (Surface B). It should be appreciated that the nomenclature "first" and "second" are arbitrary and thus can be reversed without consequence. As well, the surfaces 40 and 42 may constitute sides, walls, and/or the like, without limitation. Each surface 40 and 42 preferably has a large surface area for collecting water vapor. As illustrated in FIG. 2, one surface (surface A, 40) is internal or within the processing chamber 12, while another surface (surface B, 42) is external or outside the processing chamber 12. The water vapor trap 38 of FIG. 2 is movable such that either one of the surfaces 40 and 42 may be within or outside of the processing chamber 12. Movement may include rotation, pivoting, translation, or the like. When a surface is internal to the processing chamber 12, the surface is operative to collect water vapor. When a surface is external to the processing chamber 12 the surface may be regened. In this manner, the water vapor trap may operate essentially continuously (i.e. the water vapor trap can be used to collect water vapor during wafer processing while at the same time remove or regen).

As depicted in FIG. 2, the processing chamber 12 is preferably disposed inside an enclosure 11. The enclosure 11 is in communication with the vacuum 34 such that the enclosure 11 is under the same vacuum condition as the processing chamber 12. This allows the surface B (42) of the water vapor trap 38 to vent within the enclosure 11 without venting the processing chamber 12 to atmosphere.

In one form, the water vapor trap 38 may be a thermal water vapor trap such as a cooling/cold object, cooling/cold trap, or the like. In this form, the water vapor trap 38 or a portion thereof is reduced in temperature (i.e. cooled) to a temperature while within the processing chamber 12 appropriate to collect water vapor. Particularly, a surface 40 of the water vapor trap 38 that is internal to the processing chamber 12 is cooled to an appropriate temperature such that water vapor within the processing chamber 12 is caused to condense on the surface 40. Another surface 42 of the water vapor trap 38 is or may be external to the processing chamber 12 for regeneration (water removal) while the other (or another in the case of a water vapor trap having more than two surfaces) surface is internal to the processing chamber collecting water vapor. This is illustrated and/or represented in FIG. 2 by the water vapor control 50 including thermal, electrical and/or control lines 52, 54 and 56. The thermal lines provide coolant, heat and/or electricity for heat and operation of the mechanism to move the water vapor trap 38 as necessary.

Figure 3:
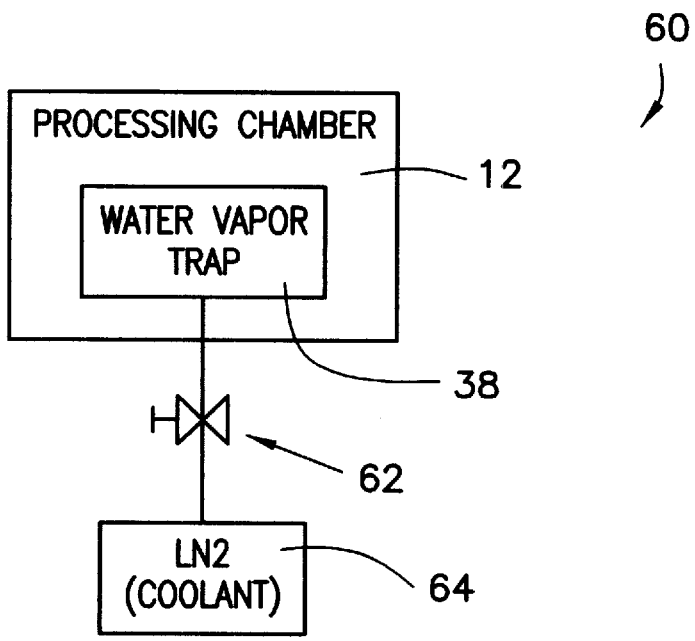
FIG. 3 is a block diagram of an exemplary cooling system for the exemplary wafer processing apparatus of FIGS. 1 and 2.
Figure 4:
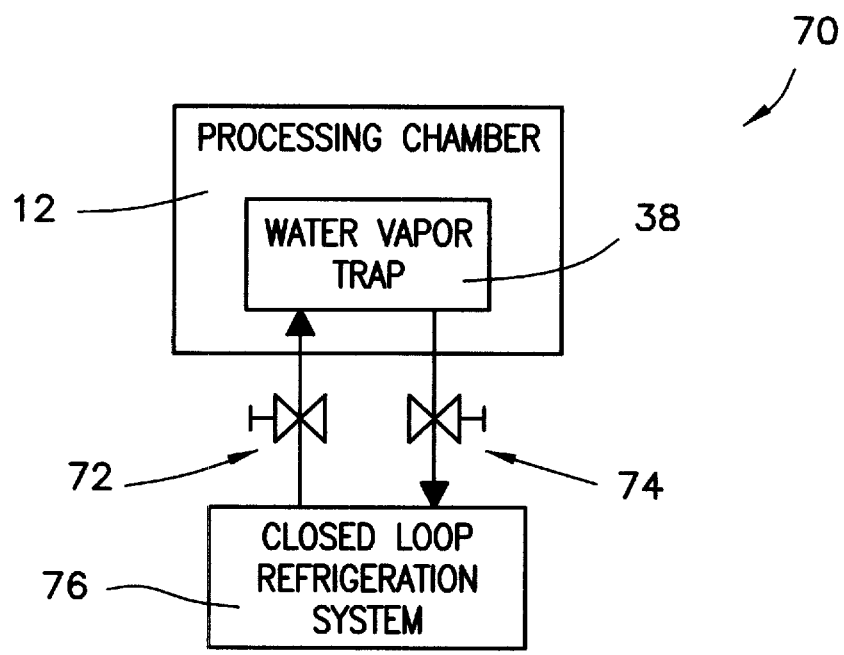
FIG. 4 is a block diagram of another exemplary cooling system for the exemplary wafer processing apparatus of FIGS. 1 and 2.

An appropriate temperature for the cooling object (the water vapor trap 38 and/or a portion thereof) is 77K or higher. This can be achieved utilizing several methods. Referring to FIG. 3, an exemplary manner of providing a cooling object is illustrated as a system 60. The system 60 includes the processing chamber 12 with the water vapor trap 38. The water vapor trap 38 is in communication with a coolant such as a liquid gas (e.g. LN2 or the like) 64 via valving/piping 62. The system 60 depicted in FIG. 3 is a one-way system. Referring to FIG. 4, another exemplary manner of providing a cooling object is illustrated as a system 70. The system 70 includes the processing chamber 12 and the water vapor trap 38. The water vapor trap 38 is in communication with a closed loop refrigeration system 76 via valving/piping 72 and 74. The system 70 depicted in FIG. 4 is a two-way system. It should be appreciated that manner in which the water vapor trap 38 is cooled as described above and/or depicted in FIGS. 3 and 4 are only exemplary and do not limit the types of cooling systems that may be used.

Figure 5:
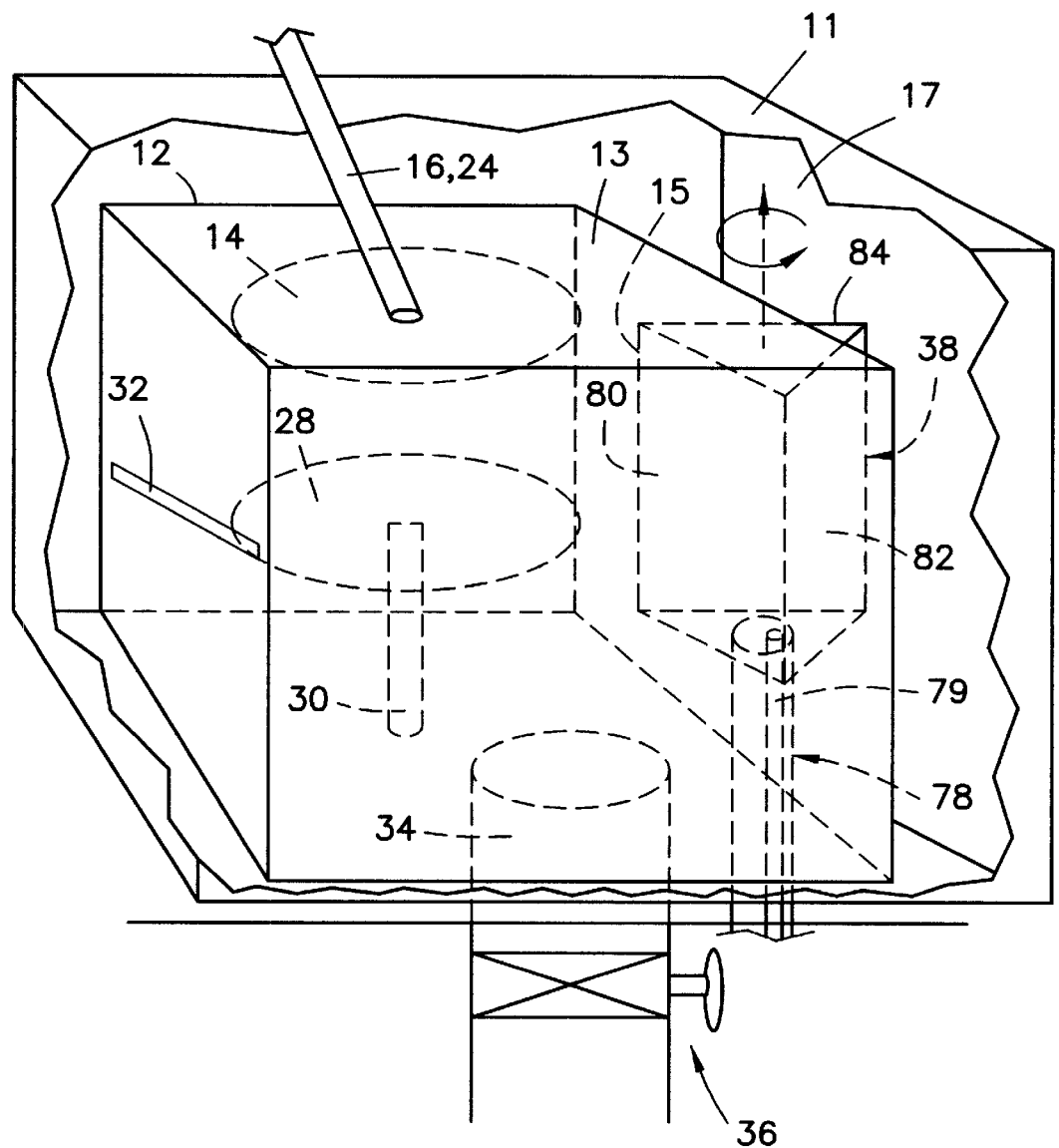
FIG. 5 is a perspective view of an exemplary wafer processing apparatus in accordance with the principles of the subject invention.

Referring to FIG. 5, there is depicted a processing chamber 12 in accordance with the principles of the subject invention. The processing chamber 12 includes the various components described above in conjunction with FIGS. 1 and 2. The processing chamber 12 is disposed within an interior 17 of the enclosure 11. The processing chamber 12 includes a water vapor trap 38 that is embodied as a multi-surfaced and movable (rotatable as represented by the axis of rotation arrow and circular arrow) device 38. The water vapor trap 38 is maintained on and/or by a support 78. The support 78 includes tubing, piping, and/or the like 79 that supplies the coolant, heat, electricity and/or control signals for the operation of the water vapor trap 38 (see item 50 in FIGS. 1 and 2).

In the example of FIG. 5, the water vapor trap 38 is a cooling/cooled object that includes three sides, walls, or surfaces 80, 82, and 84. In accordance with one form of the subject invention, the water vapor trap 38 is disposed outside the processing chamber 12 but inside the enclosure 11 and is operative to present one surface 80, 82 or 84 into the processing chamber 12. In this embodiment, a wall 13 of the processing chamber 12 includes a cutout 15 essentially the same size as one of the surfaces 80, 82, and 84. Since the water vapor trap 38 is rotatable, the water vapor trap 38 is operative to present one surface at the cutout 15 such that the particular surface is exposed to the interior of the processing chamber 12. A seal or the like may be positioned about the cutout 15 and/or the surfaces 80, 82, and 84 of the water vapor trap 38.

Figure 6:
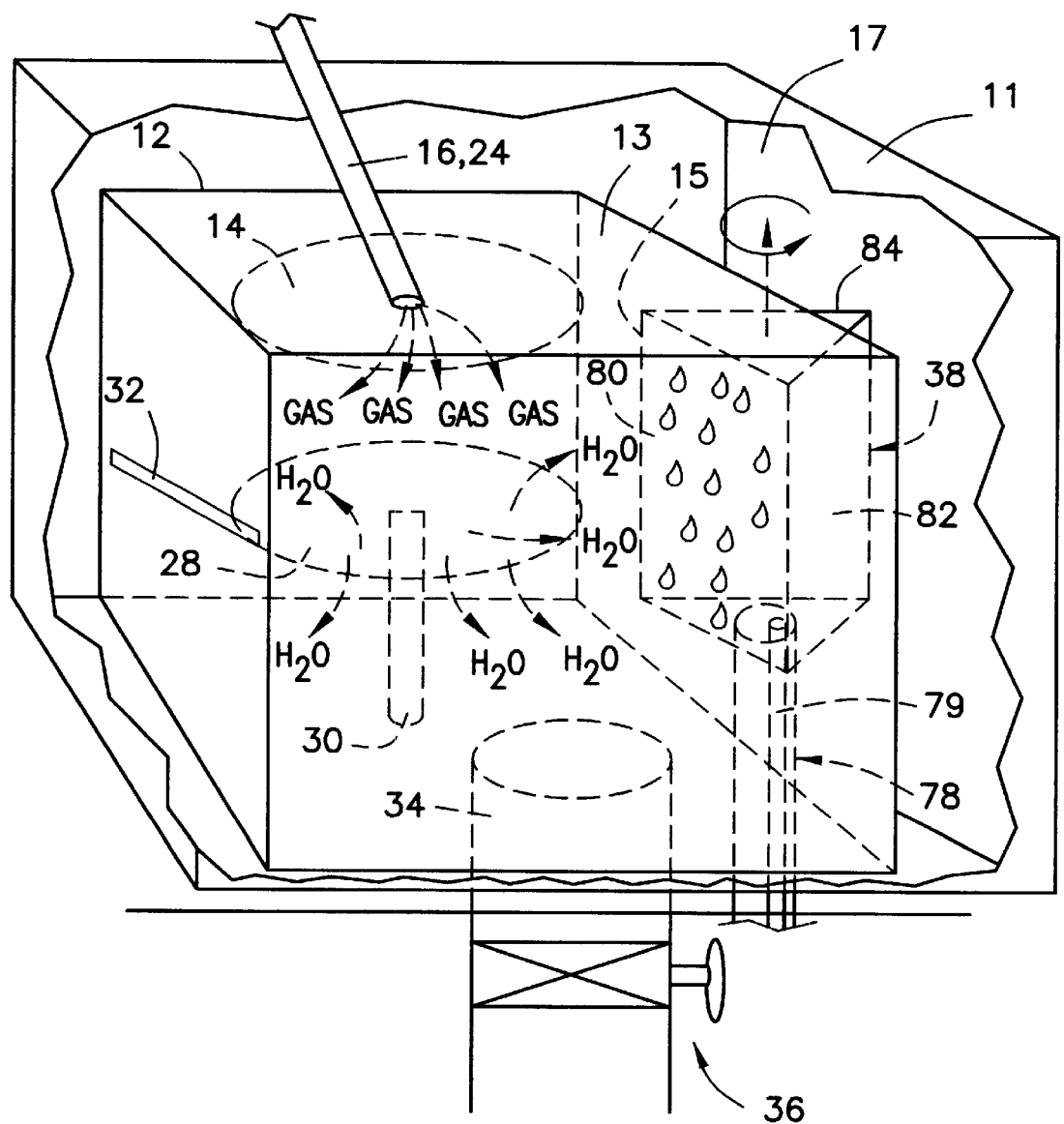
FIG. 6 is a perspective view of the exemplary wafer processing apparatus of FIG. 5 illustrating production of water vapor during wafer processing and collection of the water vapor by a water vapor trap in accordance with the principles of the subject invention.

In FIG. 5, the surface 80 is presented at the cutout 15 and thus is depicted as presenting itself to the interior of the processing chamber 12. The surface 80 is caused to be cooled to around 77K or higher. The other surfaces 82 and 84 are not cooled and one surface may be heated to remove any water vapor that has been collected thereon (particularly by condensation). Referring to FIG. 6, the processing chamber 12 is shown during a wafer processing mode. Particularly, gas is emanating from the processing head 14 as represented by the various arrows labeled "gas." As well, water (H$_2$O) vapor is being produced as a byproduct of the wafer processing as represented by the arrows labeled "H$_2$O." As illustrated, the water vapor in the processing chamber 12 as a byproduct of wafer processing, condenses on the surface 80 that has been appropriately cooled. The surface 80 thus collects, traps, or accumulates the water vapor thereon. The parts of the water vapor trap 38 outside the processing chamber 12 (but inside the enclosure 11) are in the vacuum of the enclosure 11 so they can be vented, changed, regened, or the like with very little impact to the processing chamber 12 and the processing occurring therein.

Figure 7:
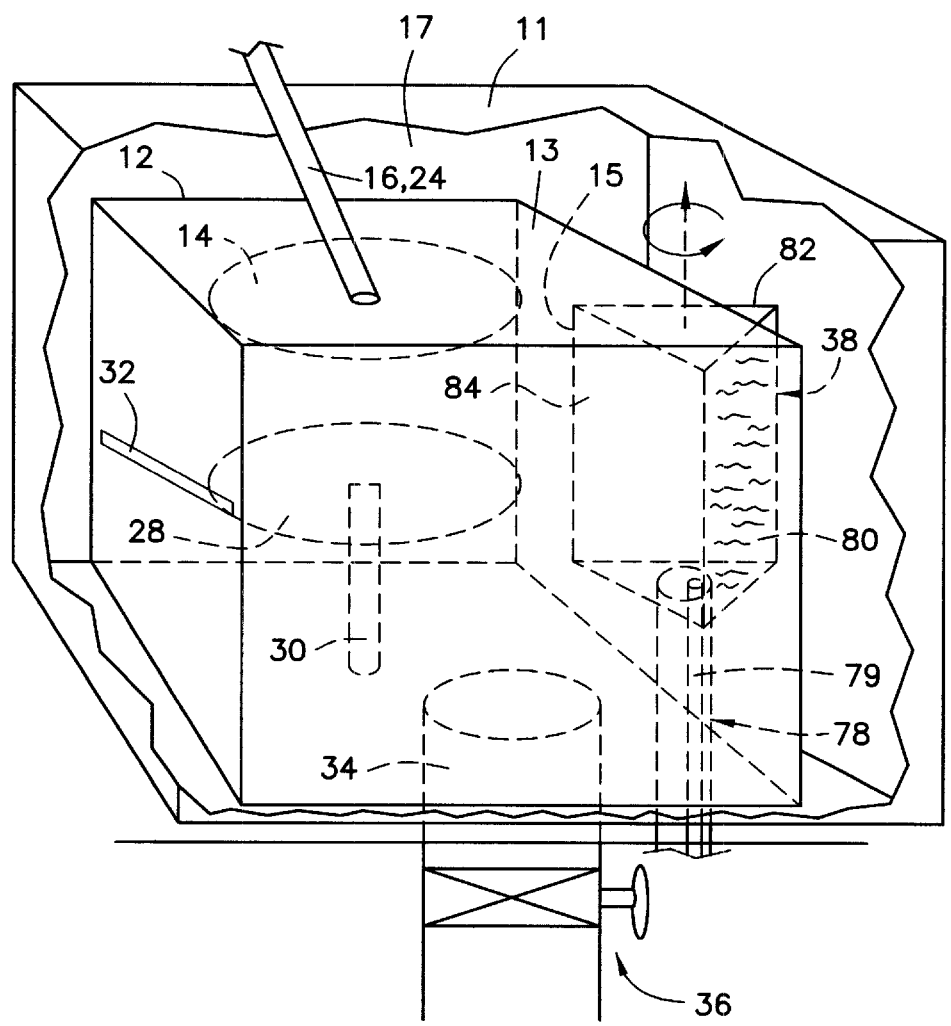
FIG. 7 is a perspective view of the exemplary wafer processing apparatus of FIGS. 5 and 6 illustrating a manner of removing the collected water vapor.

In FIG. 7, the water vapor trap 38 has been rotated to present a clean or regened surface (here surface 84) to the inside of the processing chamber 12. The surface 80 with a maximum amount of water vapor condensed thereon is moved to the outside of the processing chamber 12. In this manner, wafer processing may continue while a surface of the water vapor trap 38 may be regened. The processing chamber does not have to shut down for the regen process. The water vapor shown condensed on the surface 80 in FIG. 6 is shown as an outgas (not droplets) such that the water vapor can be exhausted therefrom.

The water vapor trap of FIGS. 5–7 has three surfaces or portions each of which is separately cooled and heated. Each surface or portion is also separately positionable in communication with or in the interior of the processing chamber and in communication with or in the exterior of the processing chamber. This may be accomplished by providing a temporary and replaceable wall, side or other surface portion of the processing chamber as depicted in FIGS. 5–7. This may also be accomplished in other manners such as by completely moving all or a portion of the water vapor trap into and out of the processing chamber.

It should be appreciated that the water vapor trap may be embodied as a two-surface to a multi-surfaced object. As well, the water vapor trap may move in any manner that allows a surface thereof to be presented to the interior of the processing chamber and permits the surface to be removed from the interior once "full." Further, the water vapor trap may be movable in any manner with respect to a surface or surfaces of the water vapor trap or the water vapor trap itself.

Figure 8:
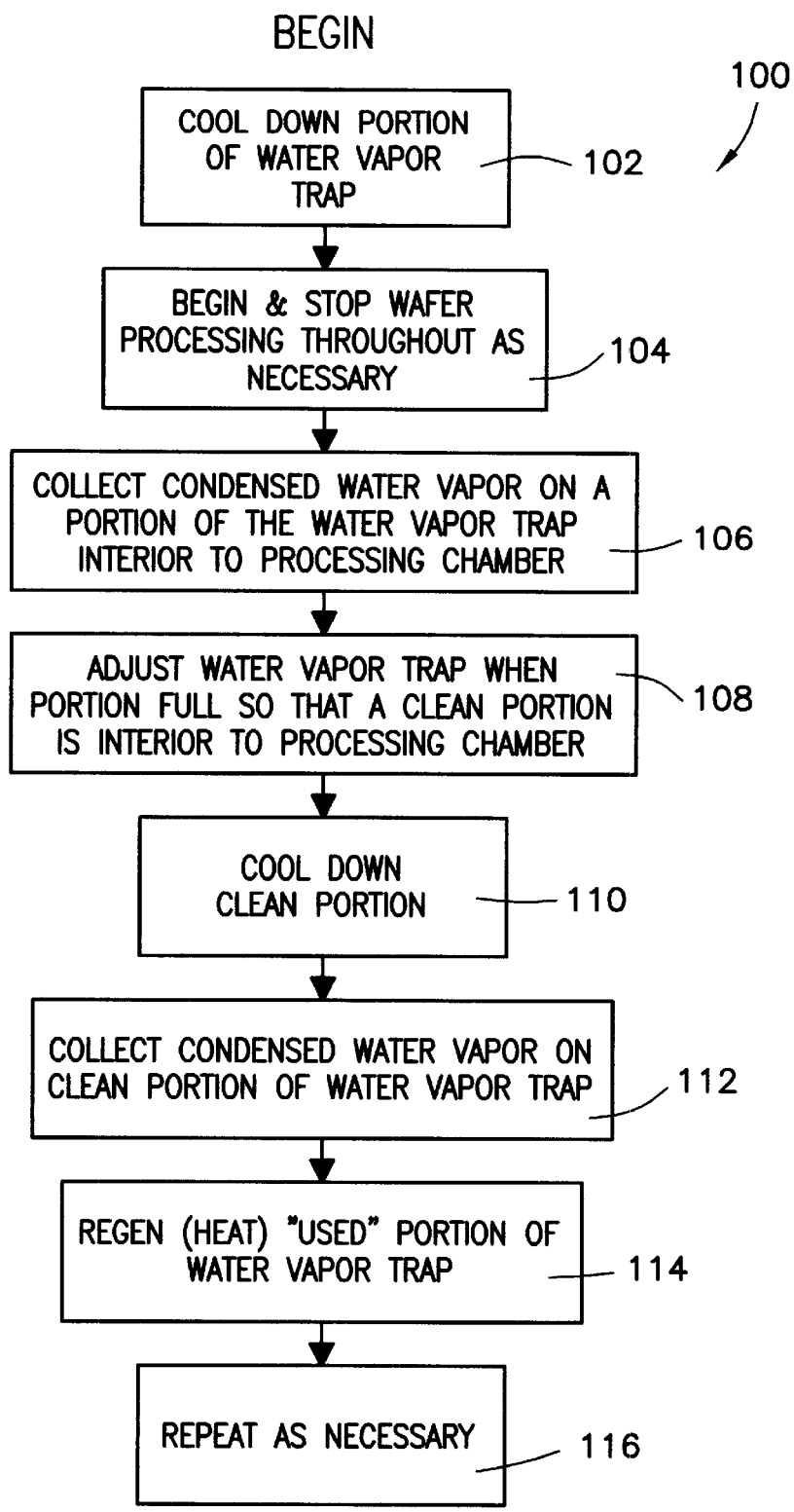
FIG. 8 is a flowchart depicting an exemplary process for removing water vapor from a wafer processing chamber generated as a byproduct of wafer processing.

FIG. 8 depicts a flowchart, generally designated 100, of an exemplary manner of operation of the subject invention and reference is now made thereto. In step 102, a portion (or all depending on the particular embodiment of water vapor trap utilized) of the water vapor trap is cooled down to a temperature of approximately 77K or higher. In step 104, wafer processing within the processing chamber may be started and stopped numerous times throughout and/or during the operation of the water vapor trap as shown and described.

Proceeding, in step 106, water vapor within the processing chamber is collected, trapped, accumulated, and/or the like on a portion of the water vapor trap that is interior to the processing chamber. This is accomplished by the water vapor condensing on the cooled portion of the water vapor trap. In step 108, when the portion of the water vapor trap is "full" of condensed water vapor (i.e. its capacity is at a maximum or sooner if desired) the water vapor trap is adjusted (e.g. moved, rotated, etc.) to remove the "full" portion and replace it with a "clean" portion. In step 110, the "clean" portion is then cooled down to approximately 77K or higher. The "clean" portion is then ready to collect condensed water vapor as indicated in step 112.

In step 114, the "used" portion of the water vapor trap is then regenerated ("regened"). This may be accomplished by heating up the used portion to burn off the condensed water vapor. Once all of the condensed water vapor has been removed, the portion is now "clean" and ready to repeat the process as indicated in step 116.

While this invention has been described as having a preferred design and/or configuration, the subject invention can be further modified within the spirit and scope of this disclosure. This application is therefore intended to cover any variations, uses, or adaptations of the invention using its general principles. Further, this application is intended to cover such departures from the subject disclosure as come within known or customary practice in the art to which this invention pertains and which fall within the limits of the appended claims.

What is claimed is:

1. In a wafer processing chamber defining an interior, the wafer processing chamber having a processing head in the interior and in communication with a processing gas, a wafer holder in the interior and adapted to receive a wafer for processing, and a pumping port in communication with the interior and a pump, a method of operating the wafer processing chamber comprising the steps of:

providing a water vapor accumulator having a first surface thereof in the interior of the processing chamber;

cooling the first surface of the water vapor accumulator in the interior of the processing chamber to a water vapor condensation temperature;

processing a wafer supported on the wafer holder utilizing the process gas, the wafer processing generating water vapor as a byproduct;

accumulating the generated water vapor on the first surface of the water vapor accumulator in the interior of the processing chamber; and removing the generated water vapor accumulated on the first surface of the water vapor accumulator in the interior of the processing chamber from the interior of the processing chamber.

2. The method of claim 1, wherein the water vapor condensation temperature comprises a temperature no lower than approximately 77K.

3. The method of claim 1, further comprising the steps of:

positioning a second surface of the water vapor accumulator into the interior of the processing chamber while the first surface is exterior of the interior;

cooling the second surface of the water vapor accumulator in the interior of the processing chamber to the water vapor condensation temperature;

accumulating the generated water vapor on the second surface of the water vapor accumulator in the interior of the processing chamber; and removing the generated water vapor accumulated on the second surface of the water vapor accumulator from the interior of the processing chamber.

4. The method of claim 3, wherein moving the first surface out of the interior of the processing chamber, and positioning a second surface of the water vapor accumulator into the interior of the processing chamber while the first surface is exterior of the interior includes simultaneously rotating the first and second surfaces of the water vapor accumulator.

5. The method of claim 3, further comprising the step of:

regenerating the first surface of the water vapor accumulator while the second surface of the water vapor accumulator is accumulating water vapor interior of the processing chamber.

6. The method of claim 1, wherein the step of providing a water vapor accumulator having a first surface thereof in the interior of the processing chamber includes providing a water vapor accumulator having a first surface thereof forming a part of a wall of the processing chamber.

\* \* \* \* \*